Oct. 23, 1928.  1,688,738
L. Q. MOORE
CAR SEAL
Filed Aug. 19, 1926
Fig. 1.
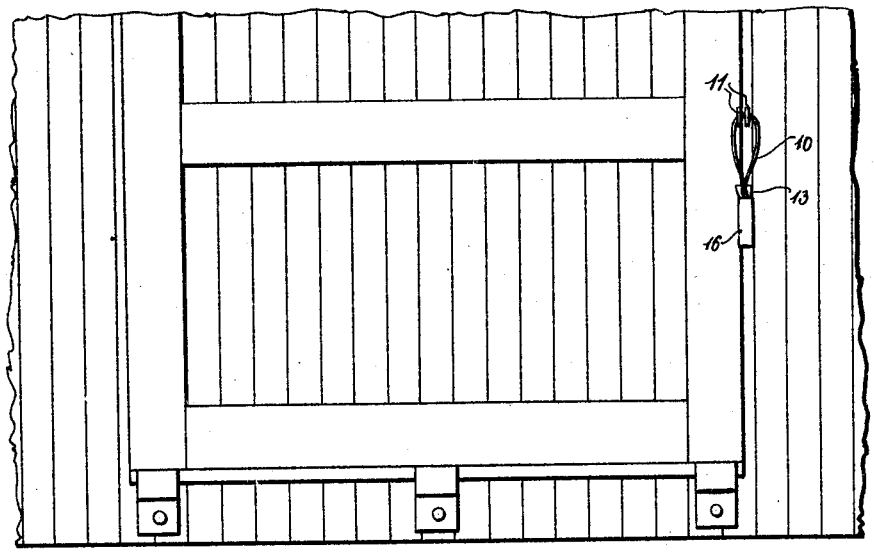
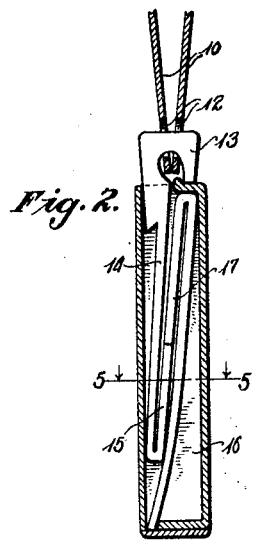
Fig. 2.
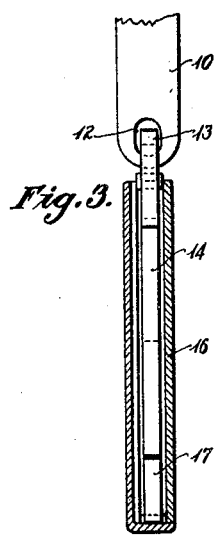
Fig. 3.
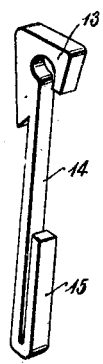
Fig. 4.
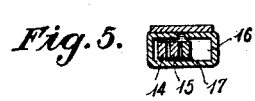
Fig. 5.
Inventor
L. Q. Moore Patented Oct. 23, 1928.

1,688,738

UNITED STATES PATENT OFFICE.

LOU Q. MOORE, OF PUEBLO, COLORADO.

CAR SEAL.

Application filed August 19, 1926. Serial No. 130,261.

This invention relates to improvements in seals designed for sealing railway freight cars and other containers such as boxes, crates and the like.

The object of the invention is to produce a simple but efficient seal that can be cheaply manufactured and which will serve as a sure preventative of tampering with the cars, etc., without detection.

In the accompanying drawings:

Figure 1 shows a section of a car door with the present seal applied thereto.

Fig. 2 is a sectional view of the locket of the seal.

Fig. 3 is a similar view taken at right angles to Fig. 2 and

Fig. 4 is a detail view of the hook member of the lock.

Fig. 5 is a sectional view of the seal taken on line 5—5 of Fig. 2.

In the persent seal, a shackle 10 is adapted to be passed through the staples 11 on the car or other container, the ends of said shackle having holes 12 therein for cooperation with the hook 13 of the seal proper.

The shank 14 of hook 13 is formed of resilient material, such as spring steel, and has a reversely bent free end portion which forms a spring arm 15. Arm 15 is capable of being inserted in the locket 16 of the seal, said locket preferably being formed of metal and completely closed except at that end into which the arm 15 of said hook is inserted. The end in which the arm 15 is inserted is, however, only partially open so that there is formed at one side of the interior of the locket a recess in which there is preferably permanently secured a piece of resilient metal bent upon itself to form a second spring arm 17, this last mentioned arm being opposed, so to speak, to the spring arm 15 carried by hook 13 so that when the arm 15 is inserted in the locket ends of the two spring arms they will snap behind each other and securely lock the spring arm of the hook 13 in the locket.

When the arm 15 has moved into the locket far enough to be engaged by the spring arm 17, the hook 13 will have been positioned close to the partially closed end of the locket so that that end portion of the locket will absolutely prevent the ends of the shackle being removed from said hook.

From the foregoing description it will be seen that after the shank of the hook member has been inserted into the locket and the two spring arms have interlocked, the shackle cannot be removed from the car unless it or the seal is destroyed or otherwise tampered with in such fashion as to be readily noticed. In addition to the degree of safety possessed by the present seal, it is also capable of being produced at low cost. The hook and spring arm within the locket can be produced from the same material while the locket itself can be cheaply made up from stampings of comparatively low priced material.

What I claim is:

1. In a car seal embodying a flexible shackle, a locket, a hook member having an open side to permit ready attachment of the shackle thereto and adapted to be inserted in said locket, and oppositely disposed spring arms carried by said locket and hook member adapted to be sprung past each other and lock said hook member in the locket.

2. In a car seal, embodying a shackle, a locket partially open at one end forming a recess at one side of the locket, a locking member having a spring arm located in said recess, and a hook to which the shackle is attached having a shank formed with a spring arm oppositely disposed to the spring arm of the locking member, the ends of the spring arms adapted to spring past each other and interlock when the shank of the hook is inserted in the locket, the hook adapted to lie in close proximity to the end of the locket to prevent the withdrawal of the shackle ends from the hook.

LOU Q. MOORE.